US005955190A

United States Patent [19]

Majumdar et al.

[11] Patent Number: 5,955,190

[45] Date of Patent: Sep. 21, 1999

[54] ANTISTATIC LAYER FOR PHOTOGRAPHIC PAPER

[75] Inventors: Debasis Majumdar; Hans R. Grashof; Robert J. Kress, all of Rochester, N.Y.

[73] Assignee: Eastman Kodak Company, Rochester, N.Y.

[21] Appl. No.: 08/939,515

[22] Filed: Sep. 29, 1997

[51] Int. Cl.$^{6}$ .................... B32B 5/28

[52] U.S. Cl. .................... 428/327; 428/326; 430/536; 430/527; 430/530; 430/538

[58] Field of Search .................... 428/330, 537.5, 428/212, 137, 195; 524/493; 430/536, 538, 530, 124, 527; 134/109; 427/361; 548/303.1

[56] References Cited

U.S. PATENT DOCUMENTS

| | | | |
|---|---|---|---|
| 4,173,480 | 11/1979 | Woodward | 430/536 |
| 5,104,779 | 4/1992 | Saverin et al. . | |
| 5,342,745 | 8/1994 | Tai et al. | 430/538 |
| 5,466,536 | 11/1995 | Berner et al. | 428/522 |
| 5,478,709 | 12/1995 | Vandenabeele | 430/527 |
| 5,576,088 | 11/1996 | Ogawa et al. | 428/327 |
| 5,683,862 | 11/1997 | Majumdar et al. | 430/530 |
| 5,750,200 | 5/1998 | Ogawa et al. | 427/361 |
| 5,753,352 | 5/1998 | Vanmaele et al. | 428/204 |

FOREIGN PATENT DOCUMENTS

| | | |
|---|---|---|
| 558138 | 9/1993 | European Pat. Off. . |
| 644454 | 3/1995 | European Pat. Off. . |
| 60-239747 | 11/1985 | Japan . |
| 61-035441 | 2/1986 | Japan . |
| 7234476 | 9/1995 | Japan . |
| 1456885 | 12/1976 | United Kingdom . |

*Primary Examiner*—Deborah Jones
*Assistant Examiner*—Darlene David
*Attorney, Agent, or Firm*—Carl F. Ruoff

[57] ABSTRACT

The present invention is a photographic paper which includes a paper sheet with a polyolefin resin layer on each surface of the paper sheet. A print retaining antistatic layer having a dry coverage of from 10 mg/m$^2$ to 10000 mg/m$^2$ is superposed on one of the free surfaces of the polyolefin layers. The print retaining antistatic layer includes a smectite clay and a film forming polymeric binder having a glass transition temperature (Tg) less than 30° which does not intercalate inside and/or exfoliate the smectite clay. In an alternate embodiment the photographic paper includes a silver halide emulsion layer on the other free surface of the resin coated paper sheet.

16 Claims, No Drawings

ANTISTATIC LAYER FOR PHOTOGRAPHIC PAPER

CROSS REFERENCE TO RELATED APPLICATIONS

This application relates to commonly assigned copending application Ser. No. 08/937,685, filed simultaneously herewith and hereby incorporated by reference for all that it discloses. This application relates to commonly assigned copending application Ser. No. 08/940,860, filed simultaneously herewith and hereby incorporated by reference for all that it discloses.

FIELD OF THE INVENTION

This invention relates to antistatic backing layers on imaging element containing paper support, specifically photographic paper, with print or backmark retaining qualities, spliceability, minimized track off characteristics and to coating compositions suitable for its preparation. Particularly, this invention relates to polyolefin coated photographic paper supports having on one side thereof an antistatic coating of a layer capable of (i) receiving and retaining various types of marking including, printing ink and the like, (ii) being joined through heat splicing and (iii) being conveyed through roller/nip transport machines with minimal track off.

BACKGROUND OF THE INVENTION

It is known that hydrophobic resin sheet and web materials of low conductivity readily become electrostatically charged due to friction with dielectric materials and electrostatically chargeable transport means, such as rollers. The electrostatic charging is particularly severe in relatively dry environments and at high speeds of conveyance. An electrostatically charged web can result in static discharge through generation of sparks which poses fire hazards in the presence of inflammable solvents at a typical coating site. For a web containing an unprocessed photographic recording element, sparking can cause additional problems, such as, developable fog and degradation of the image quality. So, it is very important to provide antistatic protection on photographic films and paper.

For photographic paper, an additional criterion is the ability of the antistatic backing layer to receive prints (e.g., bar codes or other indicia containing useful information) typically administered by dot matrix printers and to retain these prints or markings as the paper undergoes processing.

From U.S. Pat. No. 3,525,621, it is known that antistatic properties can be given to an aqueous coating composition by practically any silica sol, but preferably a silica of large surface area of the order of 200–235 $m^2/g$ in combination with an alkylaryl polyether sulphonate. However, the high solubility of the alkylaryl polyether sulphonate in aqueous medium will cause leaching during processing resulting in poor backmark retention.

Antistatic layers on the basis of solely colloidal silica usually show microcracks upon drying which can lower the lateral conductivity. Additionally calcium stearate from the base paper often leach out through these cracks causing stearate sludge in the processing tanks, requiring costly clean up operations. U.S. Pat. No. 4,173,480 teaches the use of synthetic hectorite as antistatic additive to a silica containing layer. However, the hydrophilicity of the hectorite results in poor backmark retention upon exposure to processing solutions. In fact, the experience in the trade is most colloidal silica based antistatic backings without a polymeric binder provide poor post-processing backmark retention qualities for photographic paper.

U.S. Pat. No. 5,244,728 discloses backing formulations containing aluminum modified colloidal silica and an antistatic agent in a binder polymer consisting of an addition product of alkyl methacrylate, alkali metal salt and vinyl benzene. Although such backing layers provide adequate antistatic protection and backmark retention characteristics, these lack sufficient mechanical integrity as manifested in poor spliceability and track off characteristics. Heat splicing of photographic paper rolls is often carried out during printing operations and is expected to provide enough mechanical strength to resist peeling as the web goes through automatic photographic processing. Poor splice strength can cause a number of problems including jamming of automatic processing devices. Track off during conveyance can lead to undesirable build-up of materials on conveyance rollers and other surfaces often causing product defects.

The objective of the present invention is to provide an antistatic backing layer on imaging element containing paper support, specifically photographic paper, with backmark receiving and retention qualities, heat spliceability and good trackoff characteristics.

While the invention herein finds particular use in the photofinishing industry to print barcodes or other indicia on the back of paper prints by using dot matrix printers for example, it is useful and suitable for applying print or ink markings to any surface wherein the original surface does not possess the desired characteristics. The application with regard to photofinishing has a particularly stringent requirement because the backing layer must survive photographic processing through the automatic processing devices having the harshest conditions in order to be useful.

In photofinishing applications, the coating compositions must satisfy the following requirements:

1. The ingredients must be compatible. This is a particularly stringent requirement when antistatic agents are employed in the coating composition so that the print retaining layer also possess antistatic properties. The binder polymer in the coating composition in the form of a latex can be easily destabilized causing agglomeration of the latex particles to occur.

2. The coatings must be alkali resistant up to a pH of 10 to survive the photographic processing solutions.

3. The coatings must be resistant to discoloration due to processing solutions and/or aging.

4. The coatings must be able to receive and retain ink or other marking materials through the photographic processing.

5. The coatings must not be photoactive and interfere with the light sensitive portions of the photographic paper.

6. The coatings must have resistivity less than 11 log ohms at 50% RH.

7. The backside coating must be spliceable to the frontside in commercially available splicing devices and maintain sufficient peel strength.

8. The coatings must be resistant to track off during conveyance by various roller/nip transport machines during manufacturing of the photographic paper and also in the development processor.

9. The coatings must be block resistant in the rolled form. That is, in preparation of printing paper for use in photographic applications, the paper in processing is rolled upon itself. It is necessary that the write retaining layer does not block together with the opposite surface of the paper support.

10. The coatings must have a stability of from 6 to 12 months in order to be commercially acceptable.

The coatings and the coating compositions according to this invention satisfy these requirements by utilizing in combination an electrically conducting synthetic smectite clay and a polymeric binder.

SUMMARY OF THE INVENTION

The present invention is a photographic paper which includes a paper sheet with a polyolefin resin layer on each surface of the paper sheet. A print retaining antistatic layer having a dry coverage of from 10 mg/m$^2$ to 10000 mg/m$^2$ is superposed on one of the free surfaces of the polyolefin layers. The print retaining antistatic layer includes a smectite clay and a film forming polymeric binder having a glass transition temperature (Tg) less than 30° C. which does not intercalate inside and/or exfoliate the smectite clay.

In an alternate embodiment the photographic paper includes a silver halide emulsion layer on the other free surface of the resin coated paper sheet.

DETAILED DESCRIPTION OF THE PREFERRED EMBODIMENTS

This invention provides a photographic paper coated with a polyolefin resin layer on each surface, one of the free surfaces of one of the polyolefin layers bearing a print retaining antistatic layer with improved spliceability and track off characteristics. The print retaining antistatic layer has a dry coverage of from 10 mg/m$^2$ to 10000 mg/m$^2$ and is superposed on one of the free surfaces of the polyolefin layers. The print retaining antistatic layer includes a smectite clay which is a layered hydrous magnesium silicate, and a film forming polymeric binder wherein the polymeric binder has a glass transition temperature (Tg) less than 30° C.

When a photographic paper containing a polyolefin layer on either side thereof is to be coated with a coating composition to impart ink retention to the surface, antistatic characteristics, spliceability, and pick off resistance, in accordance with this invention it is preferred that the polyolefin layer be corona discharge treated. While different photosensitive elements may require different coverages, the current invention can be applied to both color and black and white photosensitive papers with adjusted coverage values depending on the particular application. The layers prepared in accordance with this invention exhibit resistivities less than 12 log ohms/square at 50% relative humidity and preferably from about 9 to 11 log ohms/square.

The clay material (component A) used in this invention is a smectite clay. Preferably a synthetic smectite clay which closely resembles the natural clay mineral hectorite in both structure and composition is used. Hectorite is a natural swelling clay which is relatively rare and occurs contaminated with other minerals such as quartz which are difficult and expensive to remove. Synthetic smectite is free from natural impurities, prepared under controlled conditions. One such synthetic smectite clay is commercially marketed under the trade name Laponite by Laporte Industries, Ltd of UK through its US subsidiary, Southern Clay Products, Inc. It is a layered hydrous magnesium silicate, in which magnesium ions, partially replaced by suitable monovalent ions such as lithium, sodium, potassium and/or vacancies, are octahedrally bound to oxygen and/or hydroxyl ions, some of which may be replaced by fluorine ions, forming the central octahedral sheet; such an octahedral sheet is sandwiched between two tetrahedral sheets of silicon ions, tetrahedrally bound to oxygen.

There are many grades of Laponite such as RD, RDS, J, S, etc. each with unique characteristics and can be used for the present invention, as long as they maintain their electrical conductivity. Some of these products contain a polyphosphate peptising agent such as tetrasodium pyrophosphate for rapid dispersion capability; alternatively, a suitable peptiser can be incorporated into Laponite later on for the same purpose. A typical chemical analysis of Laponite RDS and its physical properties, as per Laponite Product Bulletin, are provided below.

TABLE 1

Typical Chemical Analysis

| Component | Weight % |
|---|---|
| $SiO_2$ | 54.5 |
| MgO | 26.0 |
| $Li_2O$ | 0.8 |
| $Na_2O$ | 5.6 |
| $P_2O_5$ | 4.1 |
| Loss on ignition | 8.0 |

TABLE 2

Typical Physical Properties

| Appearance | White Powder |
|---|---|
| Bulk density | 1000 kg/m$^3$ |
| Surface Area | 330 m$^2$/g |
| pH (2% suspension) | 9.7 |
| Sieve analysis, | 98% <250 m |
| Moisture content | 10% |

Laponite separates into tiny platelets of lateral dimension of 25–50 nm and a thickness of 1–5 nm in deionized aqueous dispersions, commonly referred to as "sols." Typical concentration of Laponite in a sol can be 0.1% through 10%. During dispersion in deionized water an electrical double layer forms around the clay platelets resulting in repulsion between them and no structure build up. However, in a formula containing electrolytes introduced from tap water or other ingredients, the double layer can be reduced resulting in attraction between the platelets forming a "House of Cards" structure.

The dispersion of clay particles in a polymer matrix can result in the formation of three general types of composite materials as discussed by Lan et al (T. Lan, P. D. Kaviratna and T. J. Pinnavia, Chem. Mater.7, 2144(1995)). (1) Conventional composites may contain clay with the layers unintercalated in a face-to-face aggregation. Here the clay platelet aggregates are simply dispersed with macroscopic segregation. (2) Intercalated clay composites are intercalation compounds of definite structure formed by the insertion of one or more molecular layers of polymer into the clay host galleries. (3) Finally, exfoliated clay-polymer composites where singular clay platelets are dispersed in a continuous polymer matrix. We discovered that the latter two arrangements of the clay in the polymer matrix provides the desired properties of the antistatic layers.

Intercalation and exfoliation of clay can be conveniently monitored by measuring the basal (001) spacing of the clay platelets using x-ray diffraction technique, as illustrated by Gianellis et al. in U.S. Pat. No. 5,554,670. With intercalation of a polymer in the clay gallery, an increase in the basal spacing of the clay is observed. When completely exfoliated, the clay diffraction peaks disappear.

In copending U.S. Ser. No. 08/937,685 it was discovered that polymeric binders capable of sufficiently intercalating inside and/or exfoliating electrically conducting synthetic smectite clay can be used with the clay to form antistatic layers for imaging element containing paper supports, particularly photographic paper. Polymeric binders capable of "sufficiently" intercalating inside the clay are defined to be those which can increase the basal plane spacing of the said clay by at least 50 percent, when the clay/binder weight ratio is changed from 100/0 to 30/70. It was observed that binders which do not sufficiently intercalate inside or exfoliate the smectite clay may lead to inferior characteristics, when used in an antistatic layer on the support. The inferiority may be in terms of poorer conductivity, dusting, and/or reddish coloration upon processing of the support.

This invention is related to an antistatic layer comprising of component A which is a conducting smectite clay and component B which is a polymeric binder, specifically an acrylic polymer or copolymer, which does not sufficiently intercalate inside or exfoliate component A, but is an excellent film former with a low glass transition temperature (Tg).

A polymeric binder which does not sufficiently intercalate inside and/or exfoliate the said clay can still be a preferred binder, provided it has excellent film forming capability with a glass transition temperature (Tg) less than 30° C. and preferably less than 20° C.

A crosslinking agent can be optionally incorporated in the coating formulation, to provide improved film integrity during processing.

The coating composition may be applied to the web with or without a defoaming agent and/or surfactant, depending on the method of application. These when used must be compatible with the latex binder and must not cause destabilization or agglomeration. In some formulations where a cross-linkable polymer is chosen as a binder, a suitable cross-linking agent may be incorporated to impart additional mechanical strength to the coating.

When a photographic paper containing a polyolefin layer on either side thereof is to be coated in accordance with this invention with a composition to impart ink retention to the surface, antistatic characteristics, spliceability, and pick off resistance, it is preferred that the polyolefin layer be corona discharge treated. The composition is coated by any conventional method for coating aqueous solutions, such as direct or offset gravure and dried at temperatures between 90° and 170° F. While different photosensitive elements may require different coverages, the current invention can be applied to both color and black and white photosensitive papers with adjusted coverage values depending on the particular application. The layers prepared in accordance with this invention exhibit resistivities less than 12 log ohms/ square at 50% relative humidity and preferably from about 9 to 11 log ohms/ square. The various attributes of the current invention arc illustrated through many examples.

In a particularly preferred embodiment, the photographic paper includes an image-forming layer which is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acctylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a photographic paper bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. Details regarding supports and other layers of the photographic elements of this invention are contained in Research Disclosure Item 38957, September 1996, Research Disclosure, Item 36544, September, 1994 and Research Disclosure, Item 37038, February 1995 incorporated by reference herein.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chlorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure Item 38957, September 1996, Research Disclosure, Item 36544, September, 1994, and the references listed therein.

The photographic silver halide emulsions utilized in this invention can contain other addenda conventional in the photographic art. Useful addenda are described, for example, in Research Disclosure Item 38957, September 1996 and Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The material chosen to illustrate the current invention is a commercially available acrylate copolymer latex, Hycar PC 448 supplied by BF Goodrich with a Tg of 16° C. As shown below, the basal plane spacing of the Laponite RDS clay increased by (14.8–13.1) or 13 percent as the clay/latex ratio is changed from 100/0 to 30/70. Thus, as per the teachings USSN (Docket 76369), Hycar PC 448 is not capable of "sufficiently" intercalating inside and/or exfoliating the Laponite RDS clay.

| Latex | weight % of Laponite RDS | weight % of latex | Basal plane (001) spacing, Angstrom |
|---|---|---|---|
| | 100 | 0 | 13.1 |
| Hycar PC448 | 30 | 70 | 14.8 |

For the comparative examples, a latex containing styrene-co-butylmethacrylate-co-sodium-2-sulfoethyl methacrylate in the ratio of 30/60/10 as described in Table 1, column 4 of U.S. Pat. No. 5,244,728, incorporated by reference herein, was used. As shown below, for this latex the basal plane spacing of the Laponite RDS clay increased by (14.2–13.1) or 1.1 Angstroms as the clay/latex ratio changed from 100/0 to 30/70. This correspoonds to an increase of 8% of the basal plane spacing. Thus, as per the teachings of copending U.S. Pat. No. 08/937,685, the aforementioned latex is not capable of sufficiently intercalating inside and/or exfoliating the Laponite RDS clay. However, the Tg of this latex is approximately 41° C. which is much higher than that taught by the present invention.

| Latex | weight % of Laponite RDS | weight % of latex | Basal plane (001) spacing, Angstrom |
|---|---|---|---|
| | 100 | 0 | 13.1 |
| Per U.S. Pat. No. 5,244,728 | 30 | 70 | 14.2 |

SAMPLE PREPARATION

Corona-discharge treated polyolefin coated photographic paper was used as the web on which aqueous coatings were applied through hopper coating and dried at 180° F. The coating coverage varied between 100 mg/m$^2$ and 600 mg/m$^2$ when dried. The samples were evaluated for surface resistivity, backmark retention, splice strength and track off.

TEST METHODS

Surface Resistivity Test

This test measures the surface resistivity of photographic papers. Samples are preconditioned at 50% RH 72° F. for at least 24 hours prior to testing. Surface resistivity is measured with a Keithly Model 616 digital electrometer using custom made electrodes.

Backmark Retention Test

A printed image was applied onto the coated papers prepared as above using a pre-process ribbon print. The paper was then subjected to a conventional developer for 30 seconds, washed with warm water for 5 seconds and rubbed for print retention evaluation. The following ratings are assigned, with numbers 1–3 indicating acceptable performance.

1=Outstanding, very little difference between processed and unprocessed appearance.

2=Excellent, slight degradation of appearance

3=Acceptable, medium degradation of appearance

4=Unacceptable, serious degradation of appearance

5=Unacceptable, total degradation.

Splice Strength Measurement

The backside of a strip of photographic paper containing the coating of interest is placed with 6–8 mm of overlap on the photographic element containing side of a similar strip of photographic paper and heated in a custom made set up for 4 seconds under 40 psi of pressure, replicating the conditions used by commercially available equipment used for heat splicing of photographic paper. The strength of the resultant splice is determined in an Instron machine as the force (measured in grams) necessary to peel the two strips apart, using a crosshead speed of 50 mm/min.

Track off Test

A loop is formed of a strip of photographic paper containing the coating of interest on its backside and is run for 15 minutes in a custom made set up over a number of rollers, including one with a soft, tacky surface and a stationary shoe, also with a soft, tacky surface. The set up is designed to simulate the conveyance of photographic web in a commercial printer. The surface of the tacky roller and the shoe in contact with the test coating is visually inspected for debris after the run and the number of specs accumulated at the shoe are counted as a measure of track off. The tests are done at 80% RH and 72° F., after preconditioning the sample at the same conditions for 12 hours, in order to maximize the generation of track off debris.

EXAMPLES

The invention is further illustrated by the following examples 1–4. The details of the samples together with the corresponding test results are listed in the following Table. It is clear that these samples prepared as per the current invention exhibit good SER, backmark retention, splice strength and trackoff characteristics desired of photographic paper.

Laponite RDS (smectite clay) in styrene acrylate binder

| SAMPLE | Laponite: PC448 | coverage mg/m$^2$ | SER log Ω/□ | Backmark retention | splice strength peel force, g | Trackoff |
|---|---|---|---|---|---|---|
| 1 | 40:60 | 300 | 9.6 | 2 | 73 | |
| 2 | 50:50 | 300 | 9.1 | 2 | 84 | clean/ a few specs |
| 3 | 60:40 | 300 | 8.9 | 2 | 118 | |
| 4 | 70:30 | 300 | 8.8 | 2/3 | 144 | sl. dusting/ 2 specs |

Comparative Examples

The details of the comparative examples 5 and 6 prepared with Laponite RDS as component A and the latex X containing styrene-co-butyl-co-sodium-2-sulfoethyl methacrylate in the ratio of 60/30/10 as described in Table 1, column 4 of U.S. Pat. No. 5,244,728 as component B together with the corresponding test results are listed in the following table. It is clear that the aforesaid latex with a Tg much higher than 30° C. results in completely unacceptable backmark retention.

| SAMPLE | Laponite: Latex X | coverage mg/m$^2$ | SER log Ω/□ | Backmark retention | splice strength peel force, g | Trackoff |
|---|---|---|---|---|---|---|
| 5 | 60:40 | 400 | 8.5 | 5 | | |
| 6 | 70:30 | 400 | 8.0 | 5 | | |

The invention has been described in detail with particular reference to certain preferred embodiments thereof, but it will be understood that variations and modifications can be effected within the spirit and scope of the invention.

What is claimed is:

1. A photographic paper comprising a paper sheet with a polyolefin resin layer on each surface of said paper sheet;

a print retaining antistatic layer having a dry coverage of from 10 mg/m$^2$ to 10000 mg/m$^2$ on one of the free surfaces of the polyolefin layers comprising:

a smectite clay; and a film forming polymeric binder having a glass transition temperature (Tg) less than 30° C. which does not intercalate inside and/or exfoliate said smectite clay.

2. The photographic paper of claim 1, wherein said smectite clay comprises a synthetic hectorite clay.

3. The photographic paper of claim 2, wherein said synthetic hectorite clay comprises a layered hydrous magnesium silicate.

4. The photographic paper of claim 1, wherein said film forming polymeric binder comprises an acrylic polymer.

5. The photographic paper of claim 1, wherein said print retaining antistatic layer further comprises a crosslinking agent.

6. The photographic paper of claim 1, wherein said print retaining antistatic layer further comprises a surfactant.

7. The photographic paper of claim 1, wherein said smectite clay is present at a dry weight percent of from 20 to 95 and said film forming polymeric binder is present at a weight percent of from 80 to 5.

8. The photographic paper of claim 1 wherein a basal plane spacing of said smectite clay increases by less than 50 percent when the smectite clay:polymeric binder weight ratio is changed from 100:0 to 30:70.

9. A photographic paper comprising a paper sheet with a polyolefin resin layer on each surface of said paper sheet;

a print retaining antistatic layer having a dry coverage of from 10 mg/m$^2$ to 10000 mg/m$^2$ on one of the free surfaces of the polyolefin layers comprising a smectite clay;

a film forming polymeric binder having a glass transition temperature (Tg) less than 30° C. which does not intercalate inside and/or exfoliate said smectite clay; and a silver halide emulsion layer superposed on the other free surface of the polyolefin layers.

10. The photographic paper of claim 9, wherein smectite clay comprises a synthetic hectorite clay.

11. The photographic paper of claim 10, wherein said synthetic hectorite clay comprises a layered hydrous magnesium silicate.

12. The photographic paper of claim 9, wherein said film forming polymeric binder comprises an acrylic polymer.

13. The photographic paper of claim 9, wherein said print retaining antistatic layer further comprises a crosslinking agent.

14. The photographic paper of claim 9, wherein said print retaining antistatic layer further comprises a surfactant.

15. The photographic paper of claim 9, wherein said smectite clay is present at a dry weight percent of from 20 to 95 and said film forming polymeric binder is present at a weight percent of from 80 to 5.

16. The photographic paper of claim 9 wherein a basal plane spacing of said smectite clay increases by less than 50 percent when the smectite clay:film forming polymeric binder weight ratio is changed from 100:0 to 30:70.

* * * * *